(12) United States Patent
Natsume et al.

(10) Patent No.: US 12,351,029 B2
(45) Date of Patent: Jul. 8, 2025

(54) LOWER VEHICLE-BODY STRUCTURE OF VEHICLE

(71) Applicant: MAZDA MOTOR CORPORATION, Hiroshima (JP)

(72) Inventors: Hirotaka Natsume, Aki-gun (JP); Toshiyuki Koga, Aki-gun (JP); Akiko Nakamoto, Aki-gun (JP); Kento Otsuka, Aki-gun (JP); Kohichi Tanimoto, Hiroshima (JP); Yuji Yokogi, Hiroshima (JP); Yoshie Nishimoto, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 400 days.

(21) Appl. No.: 18/167,163

(22) Filed: Feb. 10, 2023

(65) Prior Publication Data

US 2023/0347727 A1 Nov. 2, 2023

(30) Foreign Application Priority Data

May 2, 2022 (JP) .................................. 2022-076209

(51) Int. Cl.
*B60K 6/28* (2007.10)
*B60K 15/067* (2006.01)
(Continued)

(52) U.S. Cl.
CPC .............. *B60K 6/28* (2013.01); *B60K 15/067* (2013.01); *B62D 21/02* (2013.01); *B62D 25/2036* (2013.01); *B60Y 2200/91* (2013.01)

(58) Field of Classification Search
CPC ........ B60K 6/28; B60K 15/067; B62D 21/02; B62D 25/2036; B60Y 2200/91
See application file for complete search history.

(56) References Cited

U.S. PATENT DOCUMENTS 5,127,704 A * 7/1992 Komatsu ................ B62D 25/20
296/204
7,014,256 B2 * 3/2006 Kamura ................. B62D 25/20
296/193.07

(Continued)

FOREIGN PATENT DOCUMENTS

JP 2009-220715 A 10/2009
JP 2011183893 A * 9/2011

(Continued)

*Primary Examiner* — Jacob B Meyer
(74) *Attorney, Agent, or Firm* — Studebaker Brackett PLLC

(57) ABSTRACT

A floor tunnel protruding upwardly and extending in a vehicle longitudinal direction at a central position, in a vehicle width direction, of a floor panel, a cross member having ridgelines extending in the vehicle width direction at a rear end of the floor tunnel and a closed-cross section portion interconnecting a pair of right-and-left side sills, and a pair of right-and-left battery units positioned below the floor panel and between the side sills and provided on right-and-left sides, in the vehicle width direction, of the floor tunnel are provided. The cross member is provided with a reinforcement portion to reinforce the ridgelines in a range, in the vehicle width direction, which includes at least the position of the battery units and excludes the central position, in the vehicle width direction, of the floor panel.

9 Claims, 15 Drawing Sheets

(51) Int. Cl.
*B62D 21/02* (2006.01)
*B62D 25/20* (2006.01)

(56) References Cited

U.S. PATENT DOCUMENTS

| | | | | |
|---|---|---|---|---|
| 7,527,326 | B2 * | 5/2009 | Egawa | B62D 25/2036 |
| | | | | 296/193.07 |
| 9,022,152 | B2 * | 5/2015 | Imamura | B62D 21/157 |
| | | | | 180/68.5 |
| 9,090,160 | B2 * | 7/2015 | Yoshida | B60K 15/067 |
| 11,173,965 | B2 * | 11/2021 | Tsukamoto | B62D 25/2027 |
| 12,145,654 | B2 * | 11/2024 | Hayakawa | B62D 25/2036 |
| 2012/0212009 | A1 * | 8/2012 | Ishizono | B62D 25/2036 |
| | | | | 296/193.07 |
| 2016/0236714 | A1 * | 8/2016 | Tatsuwaki | B62D 25/2045 |
| 2023/0347727 | A1 * | 11/2023 | Natsume | B62D 25/2036 |

FOREIGN PATENT DOCUMENTS

| | | | | | |
|---|---|---|---|---|---|
| JP | 7331448 | B2 * | 8/2023 | | B60K 1/04 |
| JP | 2023165320 | A * | 11/2023 | | B60K 15/067 |
| JP | 2024108690 | A * | 8/2024 | | B62D 21/03 |

* cited by examiner

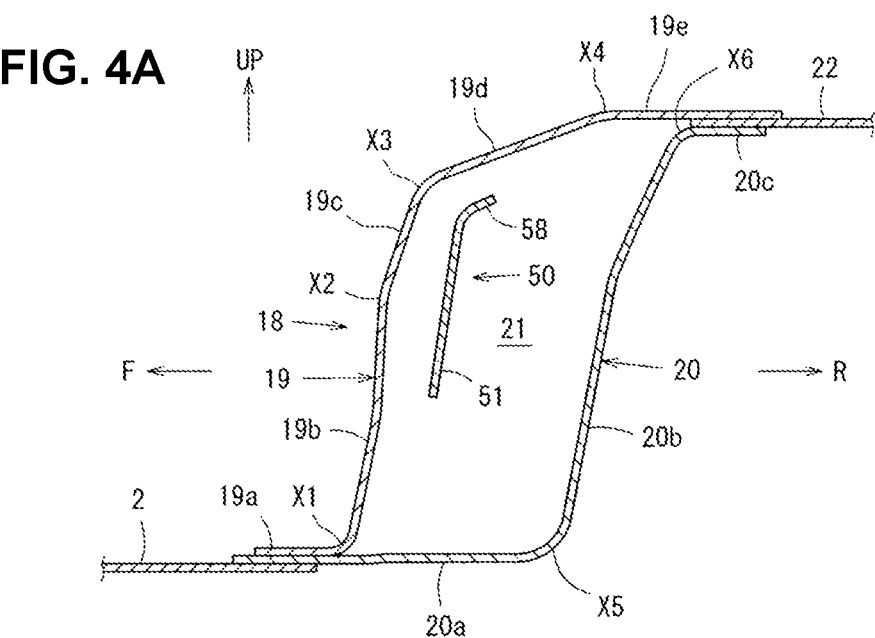
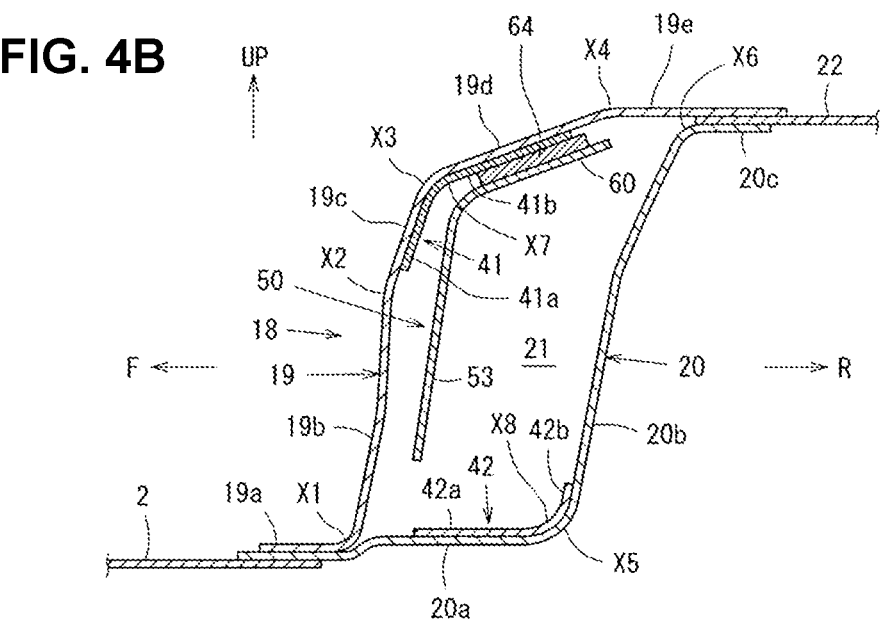

LOWER VEHICLE-BODY STRUCTURE OF VEHICLE

BACKGROUND OF THE INVENTION

The present invention relates to a lower vehicle-body structure of a vehicle, and specifically relates to the lower vehicle-body structure of the vehicle which comprises a floor tunnel protruding upwardly and extending in a vehicle longitudinal direction at a central position, in a vehicle width direction, of a floor panel, a cross member having a ridgeline extending in the vehicle width direction at a rear end of the floor tunnel and a closed-cross section portion interconnecting a pair of right-and-left side sills, and a pair of right-and-left battery units positioned below the floor panel and between the right-and-left side sills and provided on right-and-left sides, in the vehicle width direction, of the floor tunnel.

In general, in a case where a pair of right-and-left battery units are installed below the floor panel on both sides of the floor tunnel like a plug-in hybrid vehicle, it has been required that a part of a vehicle body which is positioned on a side of the side sill is suppressed from hitting against the battery unit by crushing a tunnel area where no battery unit is arranged in a vehicle side collision.

Japanese Patent Laid-Open Publication No. 2009-220715 discloses a structure in which the number of ridgelines is increased in order to improve load transmission of a side-collision load by the cross member in the vehicle side collision. In a case where this structure is applied to the above-described lower vehicle-body structure of the vehicle, stress concentration is generated at a joint portion of the cross member and the side sill because the many ridgelines come to resist in the vehicle side collision, so that the floor tunnel is not crushed properly and a floor-panel area where the battery unit is arranged comes to be crushed. Consequently, there is a concern that the part of the vehicle body which is positioned on the side of the side sill may hit against the battery unit and/or the pair of right-and-left battery units may hit against each other.

This situation will be described referring to FIG. 15. FIG. 15 is a bottom view showing a conventional lower vehicle-body structure of the vehicle in which the number of ridgelines of a cross member 96 is increased. As shown in FIG. 15, a floor frame 92 is provided at an inward-side front portion, in the vehicle width direction, of a side sill 91, and a rear side frame 93 is provided at an inward-side rear portion, in the vehicle width direction, of the side sill 91.

A tunnel side member 95 is provided below a tunnel portion 94 as the floor tunnel. A cross member 96 which extends in the vehicle width direction and interconnects a pir of right-and-left side sills 91, 91 is provided at a rear end of the tunnel portion 94.

The cross member 96 comprises a cross member upper 97 and a cross member lower 98, and has a closed-cross section portion which extends in the vehicle width direction. An end portion, in the vehicle width direction, of the cross member upper 97 is directly joined to the side sill 91, and the cross member lower 98 is joined to the side sill 91 via the rear side frame 93.

As described above, if the number of ridgelines of the cross member 96 is increased, stress concentration is generated at a joint portion of the cross member 96 and the side sill 91 because these ridgelines resist in the vehicle side collision. Thereby, a side-collision load from an obstacle, such as a pole, is directly applied to a batter unit (not illustrated), so that the tunnel portion 94 is not crushed easily, whereas a floor panel 100 is crushed largely. Consequently, there is a problem that a part of the vehicle body which is positioned on the side of the side sill 91 may hit against the battery unit and/or the pair of right-and-left battery units may hit against each other.

SUMMARY OF THE INVENTION

Accordingly, an object of the present invention is to provide a lower vehicle-body structure of a vehicle which can properly attain sectional-deformation suppression of the cross member in a normal vehicle traveling, vibrations suppression of the floor panel by this sectional-deformation suppression, and protection of the battery unit in the vehicle side collision.

The present invention is the lower vehicle-body structure of the vehicle, comprising a floor tunnel protruding upwardly and extending in a vehicle longitudinal direction at a central position, in a vehicle width direction, of a floor panel, a cross member having a ridgeline extending in the vehicle width direction at a rear end of the floor tunnel and a closed-cross section portion interconnecting a pair of right-and-left side sills, and a pair of right-and-left battery units positioned below the floor panel and between the right-and-left side sills and provided on right-and-left sides, in the vehicle width direction, of the floor tunnel, wherein the cross member is provided with a reinforcement portion to reinforce the ridgeline in a range, in the vehicle width direction, which includes at least the position of the battery units and excludes a central position, in the vehicle width direction, of the ridgeline.

The above-described reinforcement portion may be formed integrally with the cross member or separately from the cross member. According to the present invention, since the ridgeline of the cross member is reinforced by the reinforcement portion, sectional deformation of the cross member can be suppressed in the normal vehicle traveling and the vehicle-body rigidity can be improved. Further, vibrations of the floor panel can be suppressed by this improvement of this vehicle-body rigidity.

Moreover, since the reinforcement portion reinforces the ridgeline of the cross member except the central position, in the vehicle width direction, of the ridgeline, bending deformation of the floor tunnel is not hindered in the vehicle side collision. Accordingly, the stress concentration at the joint portion of the side sill and the cross member is suppressed, so that the part of the vehicle body positioned on the side of the side sill can be suppressed from hitting against the battery unit. Further, since an inward side, in the vehicle width direction, of the battery unit moves upwardly in the vehicle side collision according to the deformation of the floor tunnel, the pair of right-and-left battery units can be suppressed from hitting against each other as well.

In an embodiment of the present invention, the reinforcement portion may be a reinforcement which is provided along the ridgeline of the cross member and has an L-shaped cross section.

According to this embodiment, this simple structure, in which the reinforcement which is separate from the cross member is provided along the ridgeline of the cross member, can properly reinforce the ridgeline of the cross member and suppress the sectional deformation of the cross member in the normal vehicle traveling.

In another embodiment of the present invention, a bracket may be provided at a central position, in the vehicle width direction, of the cross member, and the bracket and the reinforcement may be joined together.

According to this embodiment, load transmission of the cross member in the normal vehicle traveling is not hindered by providing the bracket. Specifically, since the bracket serves as a transmission path of a load, the load transmission of the cross member in the normal vehicle traveling is not hindered.

In another embodiment of the present invention, a fragile portion may be formed at a central position, in the vehicle width direction, of the bracket. This fragile portion (i.e., weak portion) includes a notch, a portion having a small plate thickness, a portion which is partially weakened by heat treatment, a portion having different material strength, or the like.

According to this embodiment, since the fragile portion is formed at the bracket, the bracket can be deformed with a deformation starting point at the fragile portion in the vehicle side collision, so that the deformation of the floor tunnel is not hindered.

In another embodiment of the present invention, the fragile portion may be a notch. This notch can be formed by a recess portion, a cut portion or the like.

According to this embodiment, since the notch is formed at the bracket, the bracket can be deformed with the deformation starting point at the notch in the vehicle side collision, so that the deformation of the floor tunnel is not hindered.

In another embodiment of the present invention, the bracket may be provided with a soft joint portion having damping performance which is positioned between the cross member and the bracket. This soft joint portion includes a vibration-damping adhesive having the high Young's modulus (the modulus of longitudinal elasticity) which is configured to attain vibration damping by accumulating the strain energy and dissipating this energy as heat.

According to this embodiment, the soft joint portion positioned between the cross member and the bracket can improve the ride quality of the vehicle.

In another embodiment of the present invention, the ridgeline of the cross member may comprise an upper ridgeline and a lower ridgeline, and the reinforcement may be configured to reinforce the upper ridgeline and the lower ridgeline.

According to this embodiment, since the reinforcement reinforces the upper ridgeline and the lower ridgeline, the sectional deformation of the cross member can be further suppressed.

In another embodiment of the present invention, the reinforcement to reinforce the lower ridgeline may be provided with a tank attachment portion to attach a fuel tank.

According to this embodiment, since the reinforcement has the tank attachment portion, the fuel tank can be attached without any additional tank attachment portion.

As described above, the present invention has effects of properly attaining the sectional-deformation suppression of the cross member in the normal vehicle traveling, the vibrations suppression of the floor panel by this sectional-deformation suppression, and the protection of the battery unit in the vehicle side collision.

The present invention will become apparent from the following description which refers to the accompanying drawings.

BRIEF DESCRIPTION OF THE DRAWINGS

FIG. 4A is a major-part sectional view taken along line A-A of FIG. 2, FIG. 4B is a major-part sectional view taken along line B-B of FIG. 2.

DETAILED DESCRIPTION OF THE INVENTION

Figure 1:
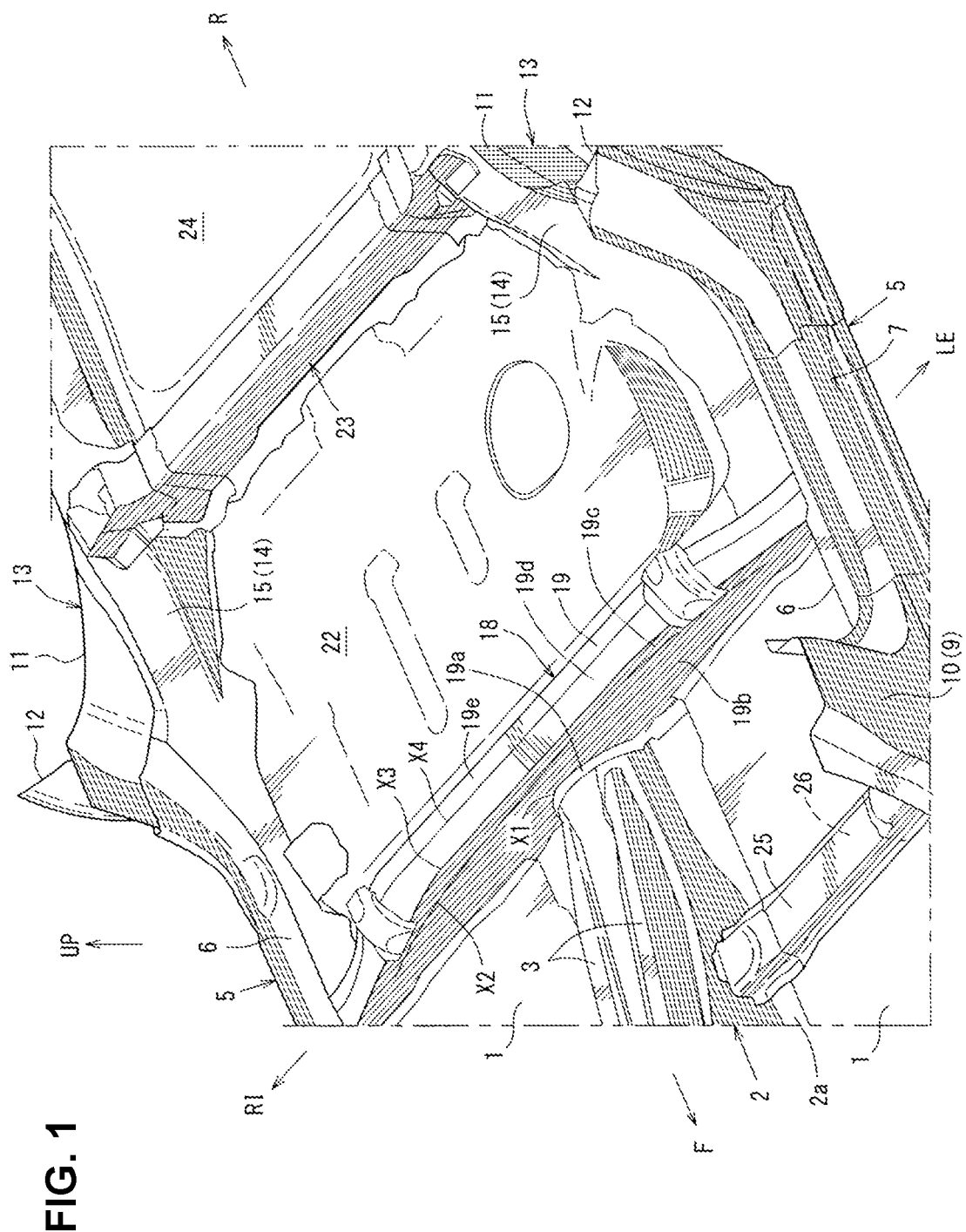
FIG. 1 is a perspective view showing a lower vehicle-body structure of a vehicle.
Figure 2:
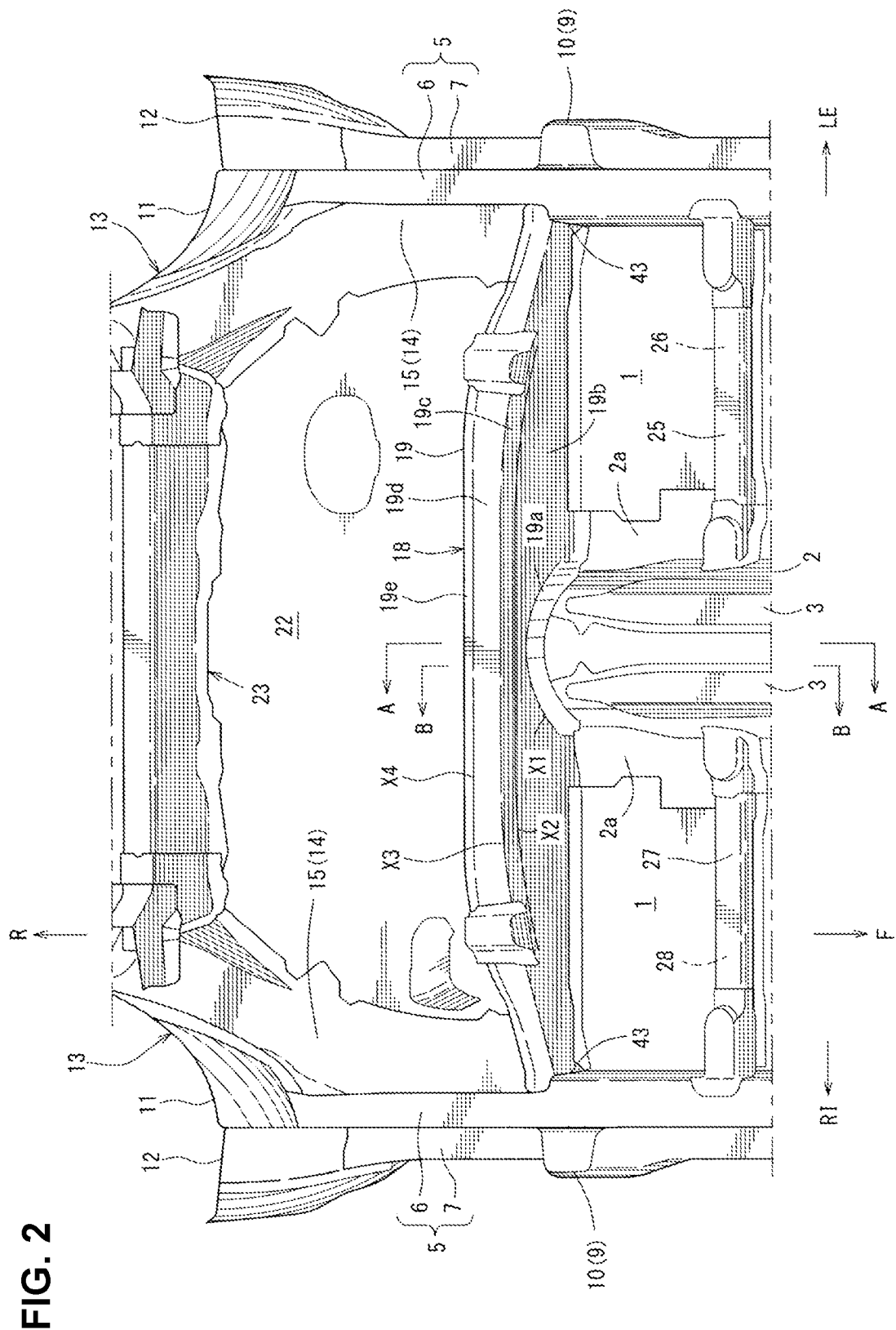
FIG. 2 is an upper-face perspective view showing a state where a major part of FIG. 1 is viewed from a just upper side.
Figure 3:
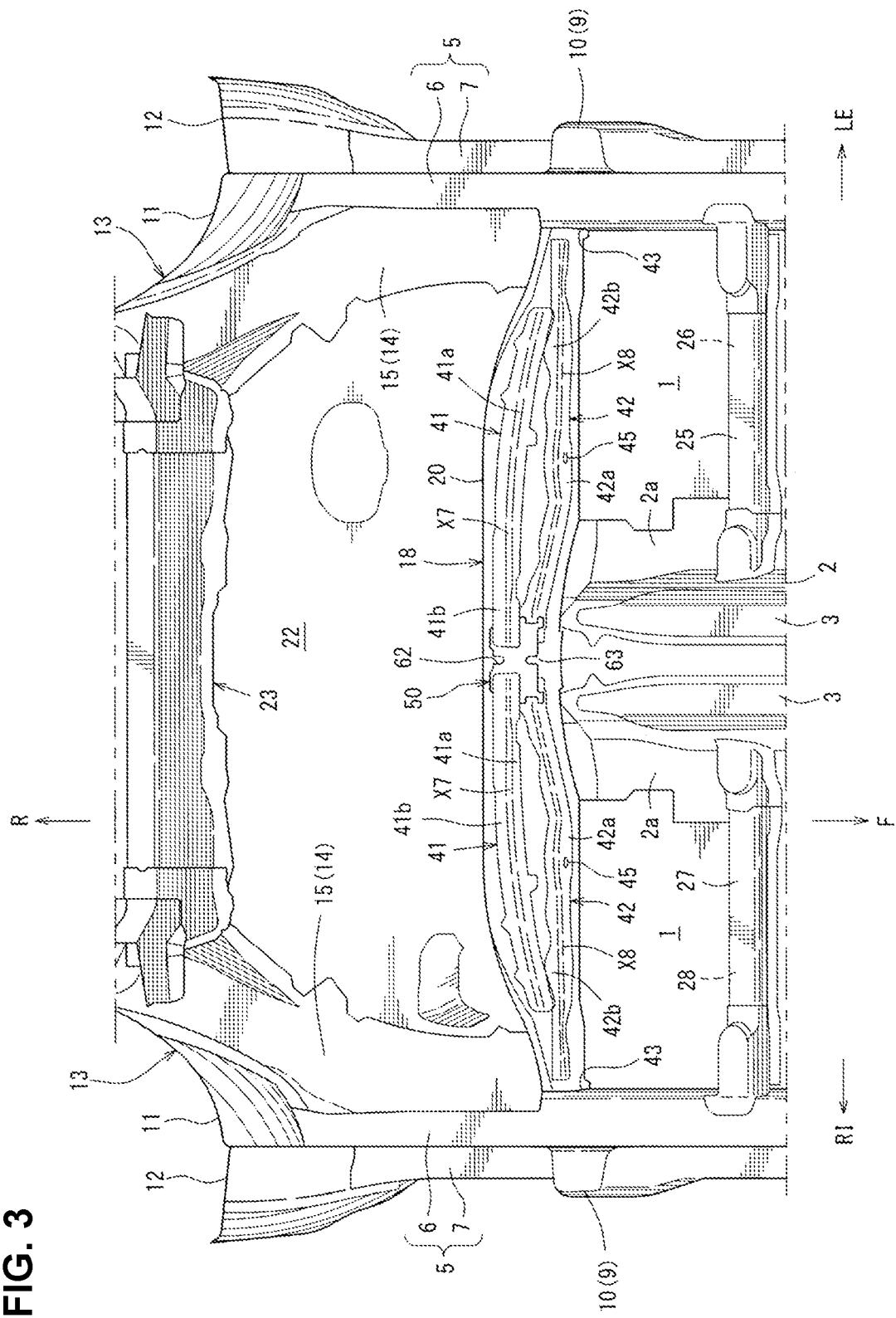
FIG. 3 is an upper-face perspective view showing a state where a cross member upper is removed from FIG. 2.

Hereafter, an embodiment of the present invention will be described specifically referring to the drawings. The drawings show a lower vehicle-body structure of a vehicle. FIG. 1 is a perspective view showing the present lower vehicle-body structure, FIG. 2 is an upper-face perspective view showing a state where a major part of FIG. 1 is viewed from a just upper side, FIG. 3 is an upper-face perspective view showing a state where a cross member upper is removed from FIG. 2, FIG. 4A is a major-part sectional view taken along line A-A of FIG. 2, and FIG. 4B is a major-part sectional view taken along line B-B of FIG. 2.

Figure 5:
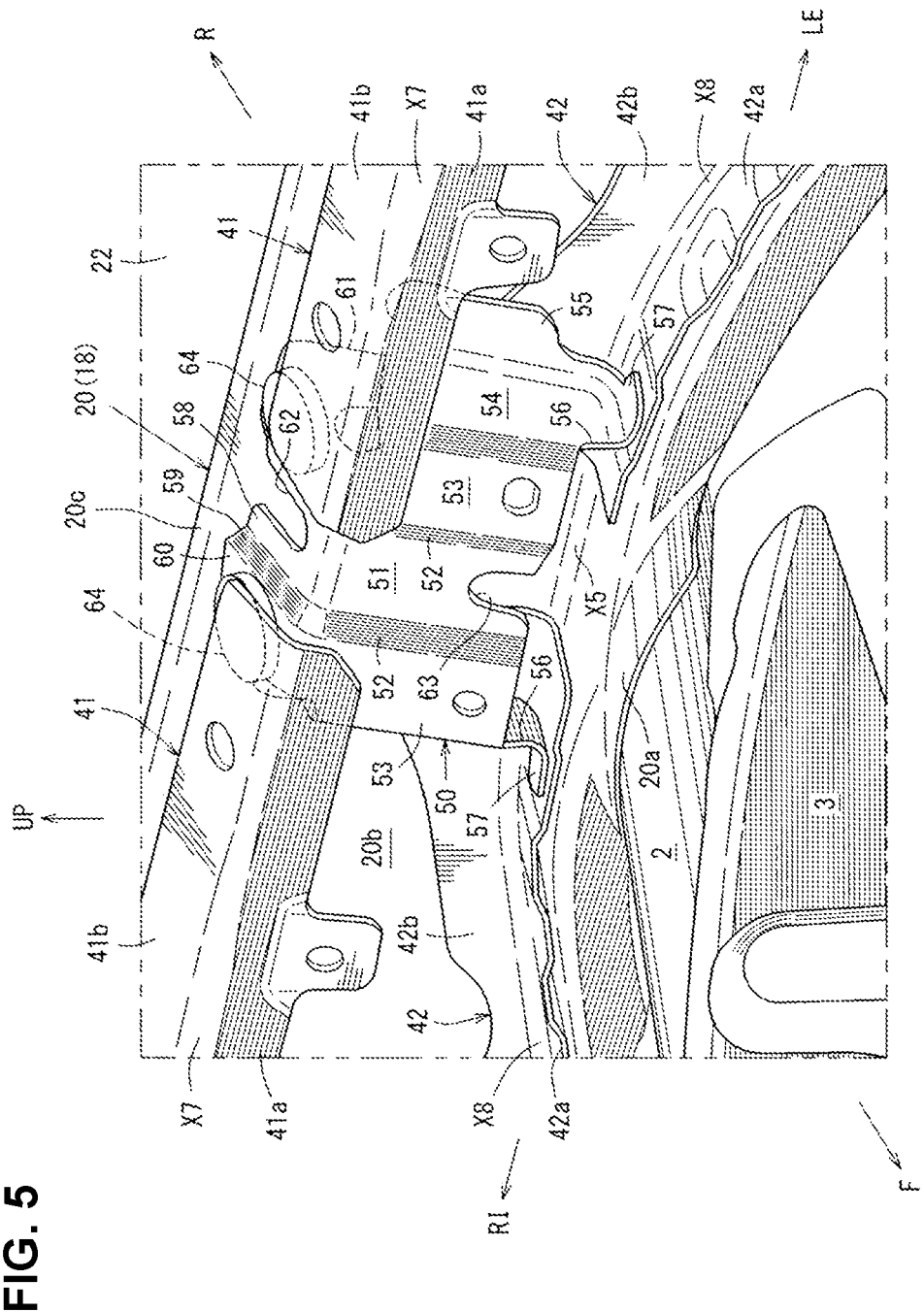
FIG. 5 is a perspective view showing a related structure of a cross member lower, upper-and-lower reinforcements, and a bracket, in a state where a cross member upper is removed.
Figure 6:
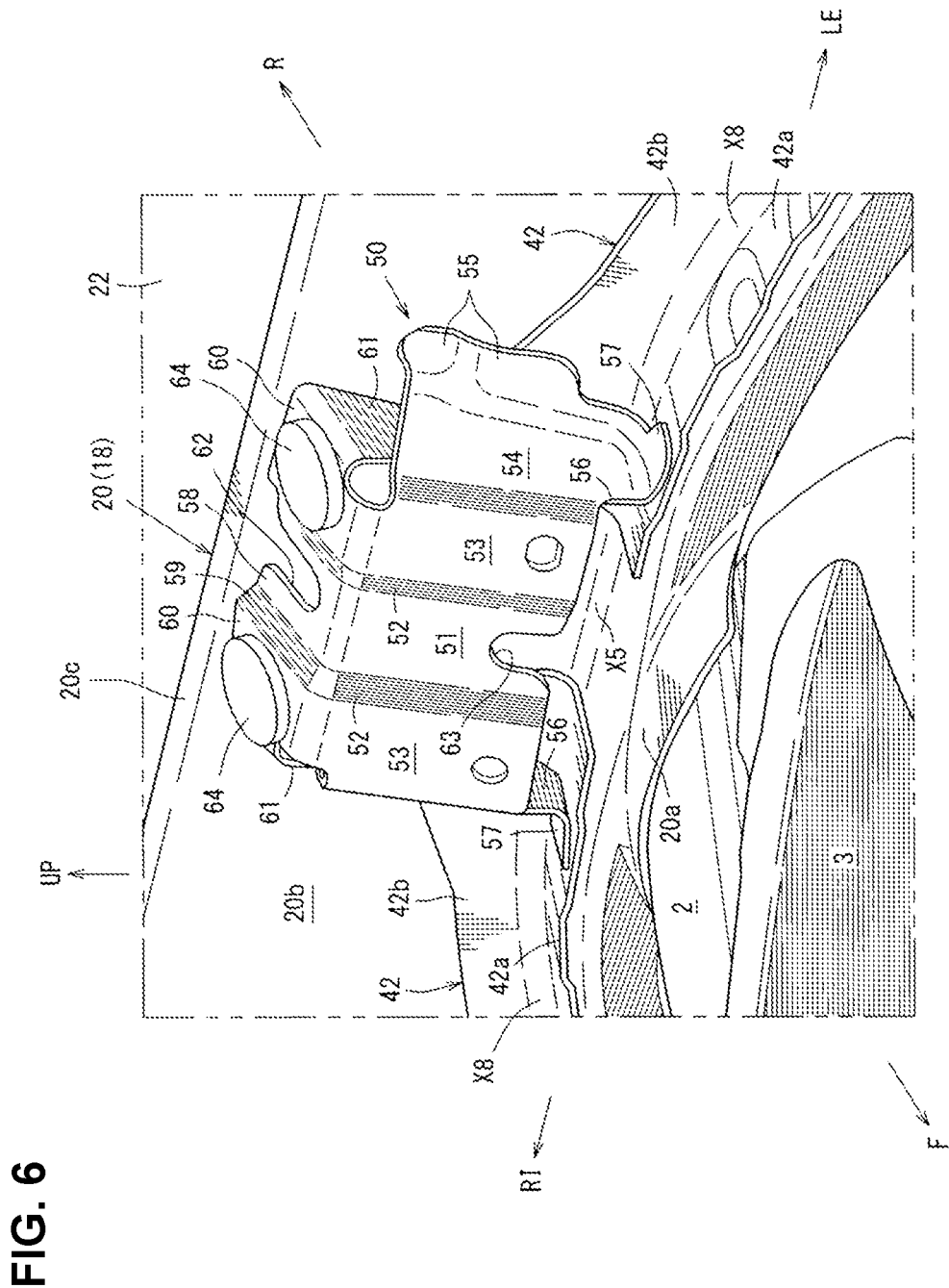
FIG. 6 is a perspective view showing a state where the upper-side reinforcement is removed from FIG. 5.

Further, FIG. 5 is a perspective view showing a related structure of a cross member lower, upper-and-lower reinforcements, and a bracket, in a state where a cross member upper is removed, and FIG. 6 is a perspective view showing a state where the upper-side reinforcement is removed from FIG. 5.

Figure 7:
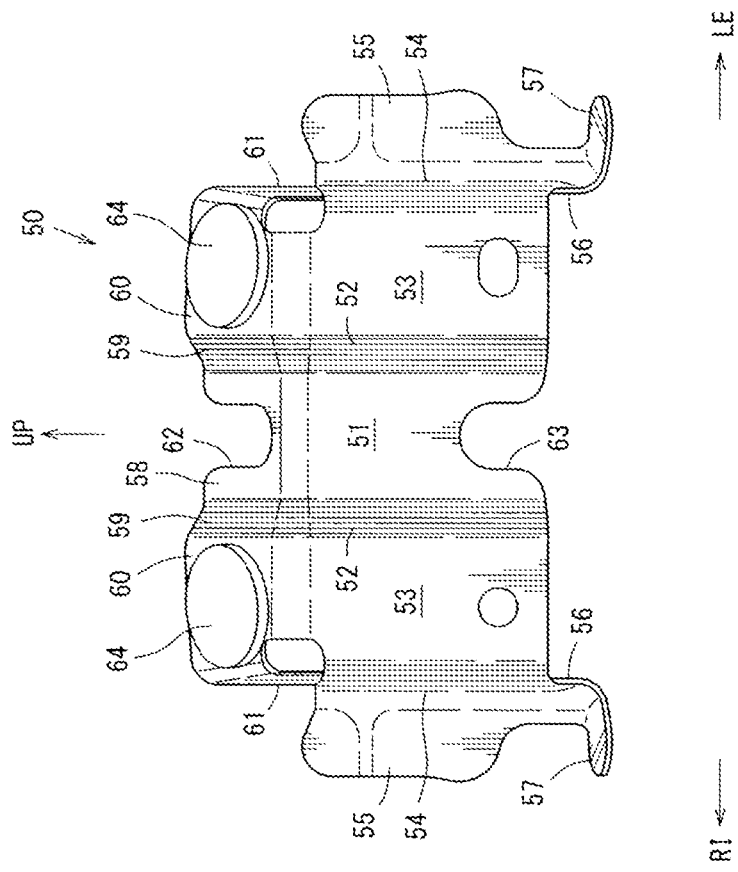
FIG. 7 is a front view of the bracket.
Figure 8:
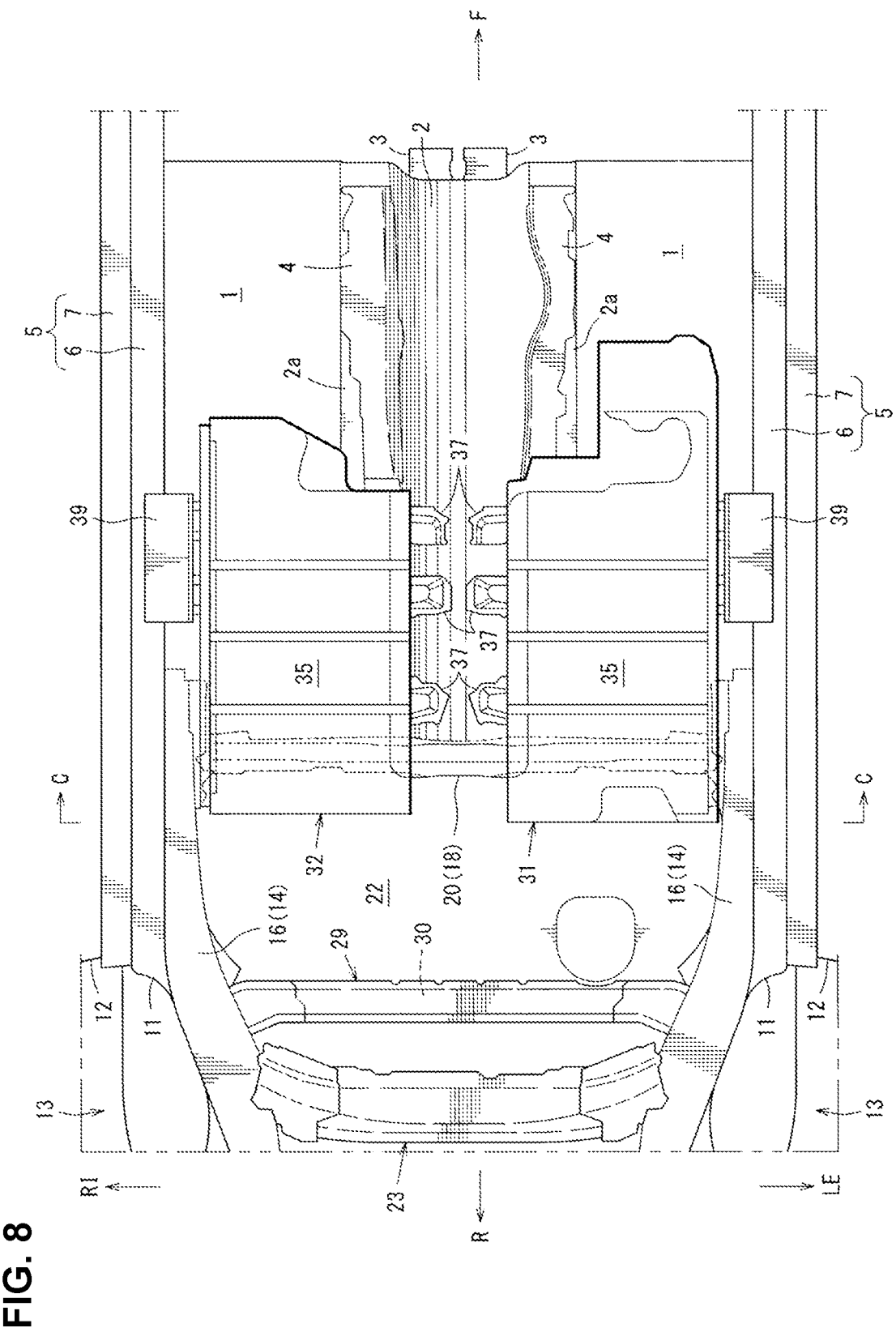
FIG. 8 is a bottom view showing an arrangement structure of battery units.
Figure 9:
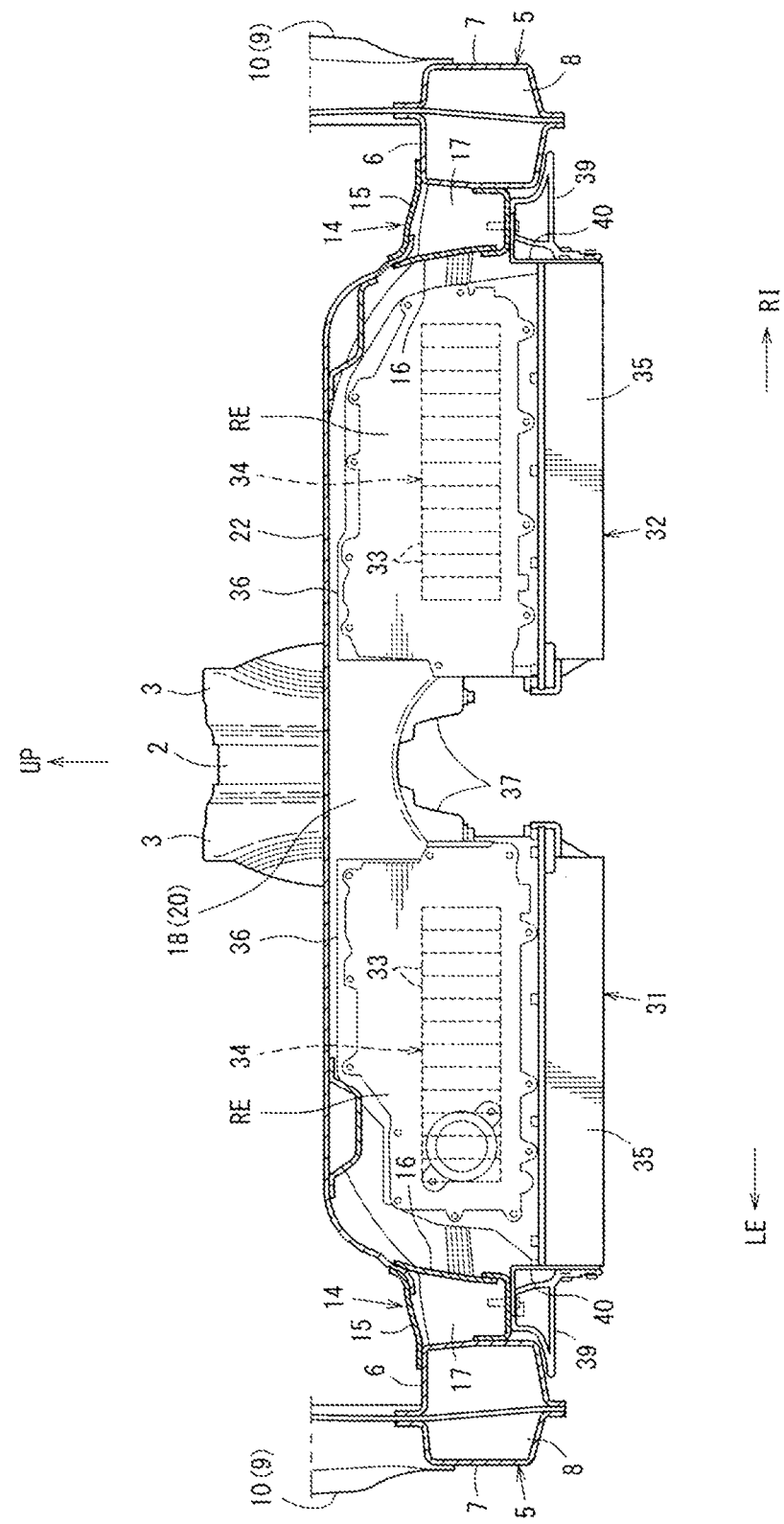
FIG. 9 is a sectional view taken along line C-C of FIG. 8.
Figure 10:
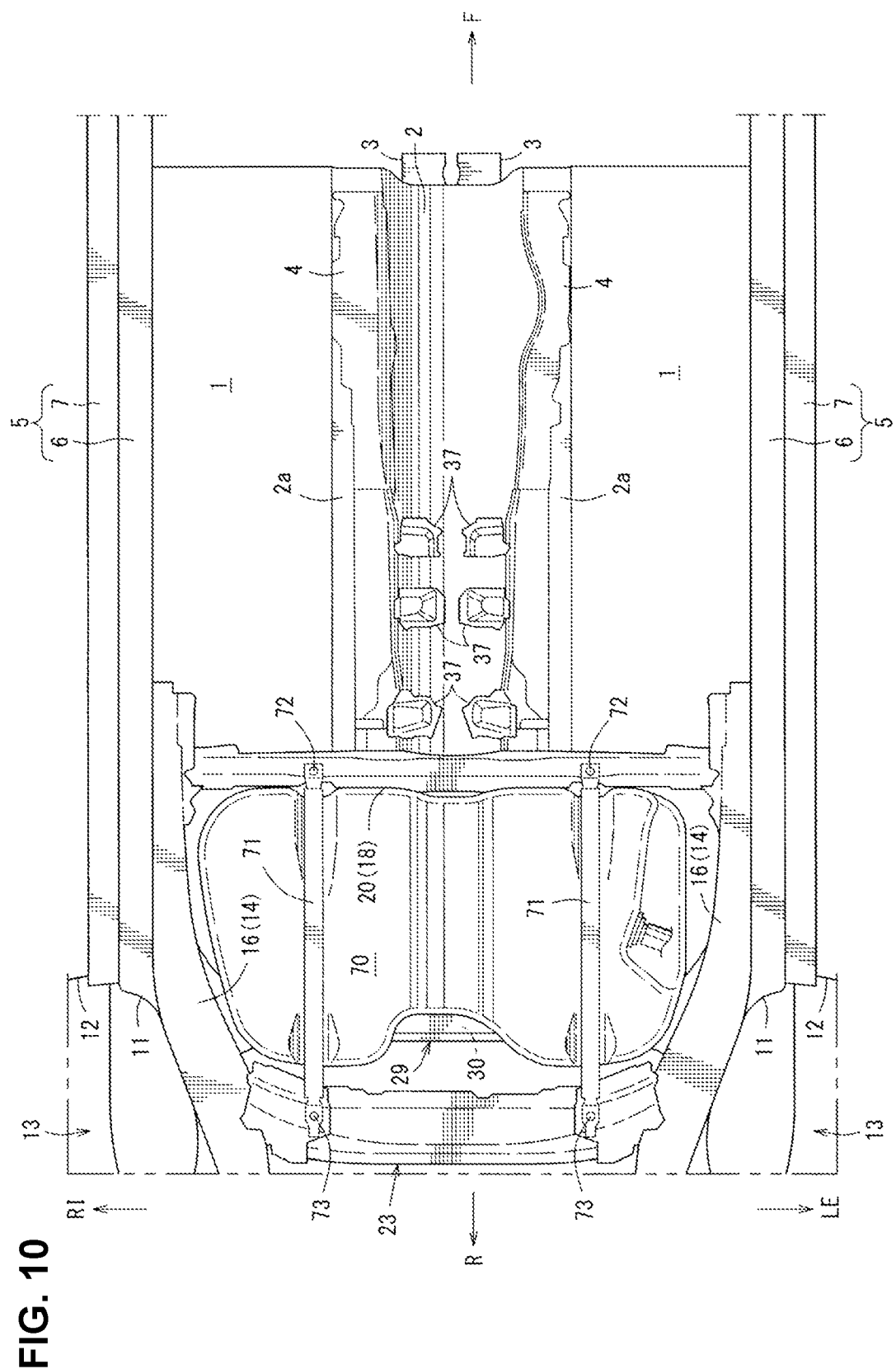
FIG. 10 is a bottom view showing an arrangement structure of a fuel tank.

Moreover, FIG. 7 is a front view of the bracket, FIG. 8 is a bottom view showing an arrangement structure of battery units, FIG. 9 is a sectional view taken along line C-C of FIG. 8, and FIG. 10 is a bottom view showing an arrangement structure of a fuel tank.

Herein, FIGS. 1-9 show the lower vehicle-body structure of a plug-in hybrid electric vehicle (so-called PHEV), whereas FIG. 10 shows the lower vehicle-body structure of a four-wheel drive (so-called 4WD) vehicle or a front-engine rear-drive (so-called FR) vehicle which are driven by a general internal combustion engine, in which a fuel tank is attached but the battery units are removed from the vehicle having the same structure as FIGS. 1-9.

As shown in FIGS. 1-3, 8 and 10, a front floor panel 1 to constitute a floor face of a cabin is provided, and a tunnel portion 2 as a floor tunnel which protrudes upwardly and extends in a longitudinal direction at a central position, in a vehicle width direction, of the front floor panel 1 is provided.

As shown in FIGS. 1-3, a pair of tunnel reinforcements 3, 3 which extend in the vehicle longitudinal direction along the tunnel portion 2 are provided at respective upper faces of upper-side right-and-left corner portions of the tunnel portion 2 protruding into the cabin. Meanwhile, as shown in FIGS. 8 and 10, a pair of tunnel side members 4, 4 are provided at a lower end portion of the tunnel portion 2 such that they extend in the vehicle longitudinal direction along respective lower end sides and tunnel lower end faces 2a of a tunnel skirt portion.

As shown in FIGS. 2, 3 and 8-10, a pair of right-and-left side sill 5 are provided at right-and-left both end portions, in the vehicle width direction, of the front floor panel 1. As shown in the same figures, the side sill 5 is a vehicle-body strength member, which is formed by a side sill inner 6 and a side sill outer 7 which are joined together so as to form a side-sill closed-cross section 8 (see FIG. 9) extending in the vehicle longitudinal direction.

As shown in FIGS. 1-3, a center pillar 9 which interconnects the side sill 5 and a roof side rail, not illustrated, in a vertical direction is provided at a center, in the longitudinal direction, of the vehicle. This center pillar 9 comprises a center pillar inner and a center pillar outer 10 and has a center-pillar closed-cross section extending in the vertical direction of the vehicle. The center pillar outer 10 is illustrated only in FIGS. 1-3.

As shown in FIGS. 1-3, a rear wheel house 13 which comprises a wheel house inner 11 and a wheel house outer 12 is provided at a rear end of each of the pair of right-and-left side sills 5.

As shown in the same figures, a rear side frame 14 is provided to extend in the vehicle longitudinal direction along the wheel house inner 11 of the rear wheel house 13. As shown in FIG. 9, the rear side frame 14 is a vehicle-body strength member, which is formed by a rear side frame upper 15 and a rear side frame lower 16 which are joined together so as to form a rear-side closed-cross section 17 extending in the vehicle longitudinal direction.

As shown in FIGS. 1-3, 8 and 10, the rear side frame 14 is provided such that its front portion overlaps with a rear end of the side sill 5.

As shown in FIGS. 1-3, a cross member 18 (so-called No. 3 cross member) which extends in the vehicle width direction at a rear end of the tunnel portion 2 and interconnects the pair of right-and-left side sills 5, 5 is provided. As shown in FIG. 4, the cross member 18 comprises a cross member upper 19 which serves as a kickup portion as well and a cross member lower 20 which are joined together so as to form a closed-cross section portion 21 extending in the vehicle width direction.

As shown in FIGS. 1-3, a rear seat pan 22 is provided as a rear floor panel which extends rearwardly from a rear portion of the cross member 18. This rear seat pan 22 extends in the vehicle longitudinal direction from the rear portion of the cross member 18 up to a position which corresponds to a middle portion, in the longitudinal direction, of the rear wheel house 13, and right-and-left both end portions, in the vehicle width direction, of the rear seat pan 22 are connected to the right-and-left rear side frame 14.

As shown in FIGS. 1-3, a rear cross member 23 (so-called No. 4 cross member) which extends in the vehicle width direction and interconnects the pair of right-and-left rear side frames 14, 14 is provided at a rear end of the rear seat pan 22. Further, a baggage-room floor 24 is provided as a rear floor panel which extends rearwardly from a rear portion of the rear cross member 23.

The baggage-room floor 24 extends rearwardly from the rear portion of the rear cross member 23 up to a rear-end position, and its right-and-left both end portions are connected to the right-and-left rear side frames 14, 14.

Meanwhile, as shown in FIGS. 1-3, a left-side front cross member 25 (so-called No. 2.5 cross member) which extends in the vehicle width direction between the left-side skirt portion of the tunnel portion 2 and the side sill inner 6 of the left-side side sill 5 and interconnects them is provided, and a closed-cross section 26 extending in the vehicle width direction is formed between the front cross member 25 and the front floor panel 1.

Likewise, as shown in FIGS. 2 and 3, a right-side front cross member 27 (so-called No. 2.5 cross member) which extends in the vehicle width direction between the right-side skirt portion of the tunnel portion 2 and the side sill inner 6 of the right-side side sill 5 and interconnects them is provided, and a closed-cross section 28 extending in the vehicle width direction is formed between the front cross member 27 and the front floor panel 1.

As shown in FIG. 8, an intermediate cross member 29 (so-called No. 3.5 cross member) which extends in the vehicle width direction and interconnects the pair of right-and-left rear side frames 14, 14 is provided at a position just before the rear cross member 23 with a certain distance between them, and a closed-cross section 30 extending in the vehicle width direction is formed between the intermediate cross member 29 and a lower face of the rear seat pan 22.

As shown in FIGS. 8 and 9, right-and-left battery units 31, 32, i.e., the first battery unit 31 and the second battery unit 32 are provided adjacently to the respective inward sides, in the vehicle width direction, of the right-and-left side sills 5, 5 and below the front floor panel 1 and the rear seat pan 22 such that the tunnel portion 2 is interposed between these battery units 31, 32 and these battery units 31, 32 are spaced apart from each other in the vehicle width direction.

Each of the first and second battery units 31, 32 comprises, as shown in FIG. 9, a battery 34 which is composed of plural battery modules 33, a battery tray 35 which covers a lower part of the battery 34 and has a recess-shaped cross section, and a battery cover 36 which covers an upper part of the battery 34 and has an inverse recess-shaped cross section.

That is, each of the first and second battery units 31, 32 is configured such that the battery 34 is supported by the battery tray 35 and arranged in a battery-storage space which is enclosed by the battery tray 35 and the battery cover 36. Further, a bottom face of the battery tray 35 is configured to be flat considering the aerodynamics performance (see FIG. 9).

As shown in FIG. 9, a relay portion RE to switch an electric circuit of the vehicle is fixed to each rear portion of the first and second battery units 31, 32. As shown in FIGS. 8-10, plural, e.g., six brackets 37, 37 . . . which are provided to extend between an upper lower face of the tunnel portion 2 and a wall face positioned on an outward side, in the vehicle width direction, of a side portion of the tunnel portion 2 are fixed by welding or other means such that the brackets 37, 37 . . . correspond to an inward position, in the vehicle width direction, of the battery units 31, 31.

Figure 11:
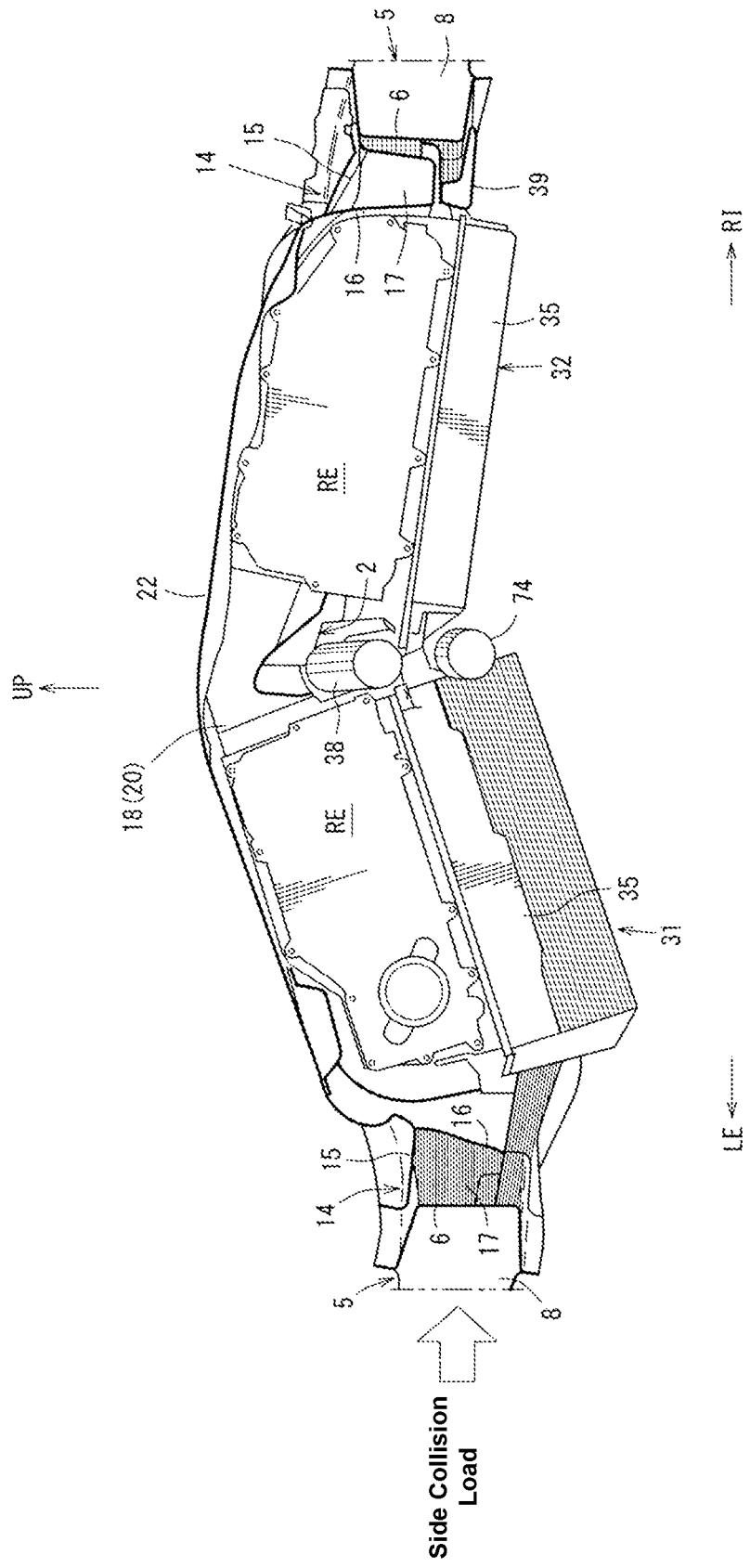
FIG. 11 is an explanatory diagram showing a state of moves of the battery units in a vehicle side collision, when viewed from a vehicle rearward side.

A pair of right-and-left brackets 37, 37 which are positioned on a vehicle front side and another pair of right-and-left brackets 37, 37 which are positioned on a vehicle rear side are the ones for supporting the battery units 31, 32, and the other pair of right-and-left brackets 37, 37 which are positioned at a central side in the vehicle longitudinal direction are the ones for supporting a propeller shaft 38 (see FIG. 11).

Each inward side, in the vehicle width direction, of the first and second battery units 31, 32 is supported at the tunnel portion 2 by a battery-hanging support member which is attached to the bracket 37.

Further, each outward side, in the vehicle width direction, of the first and second battery units 31, 32 is fixedly supported at the rear side frame lower 16 of the rear side frame 14 and a lower face portion of the side sill inner 6 by a fixing member 39 and a fixing bracket 40 as shown in FIGS. 8 and 9.

Herein, as shown in FIGS. 2 and 4A, 4B, the cross member upper 19 of the cross member 18 comprises a flange portion 19a which is fixedly joined to the front floor panel 1 and the tunnel portion 2, a vertical wall portion 19b which rises upwardly from a rear end of the flange portion 19a, a steep inclination (slope) portion 19c which obliquely extends rearwardly-and-upwardly from an upper end of the vertical wall portion 19b at a steep angle, a gentle inclination (slope) portion 19d which obliquely extends rearwardly-and-upwardly from an upper end of the steep inclination portion 19c at a gentle angle, and an upper face portion 19e which extends rearwardly from a rear end of the gentle inclination portion 19d and is fixedly joined to the rear seat pan 22, which are formed integrally.

Ridgelines X1, X2, X3, X4 which extend in the vehicle width direction, respectively, are formed at respective positions of the cross member upper 19 between the flange portion 19a and the vertical wall portion 19b, between the vertical wall portion 19b and the steep inclination portion 19c, between the steep inclination portion 19c and the gentle inclination portion 19d, and between the gentle inclination portion 19d and the upper face portion 19e.

Further, as shown in FIGS. 4A, 4B, the cross member lower 20 of the cross member 18 comprises a lower face portion 20a which is fixedly joined to the front floor panel 1 and the tunnel portion 2, a vertical wall portion 20b which obliquely rises rearwardly-and-upwardly from a rear end of the lower face portion 20a, and an upper face portion 20c which extends rearwardly from a rear end of the vertical wall portion 20d and is fixedly joined to the rear seat pan 22, which are formed integrally.

Ridgelines X5, X6 which extend in the vehicle width direction, respectively, are formed at respective positions of the cross member lower 20 between the lower face portion 20a and the vertical wall portion 20b and between the vertical wall portion 20b and the upper face portion 20c.

As shown in FIGS. 3 and 4B, the cross member 18 is provided with a reinforcement portion to reinforce the above-described ridgeline in a range, in the vehicle width direction, which includes at least the position of the battery units 31, 32 and excludes the central position, in the vehicle width direction, of the ridgelines. Specifically, the cross member 18 is provided with a pair of right-and-left upper reinforcements 41 and a pair of right-and-left lower reinforcements 42 which respectively reinforce the ridgeline X3 which is one of the plural ridgelines X1-X4 of the cross member upper 19 and the ridgeline X5 which is one of the plural ridgelines X5, X6 of the cross member lower 20. In the present embodiment, the upper-and-lower reinforcements 41, 42 are formed separately from the cross member 18.

Specifically, an inward end, in the vehicle width direction, of the upper reinforcement 41 which is positioned on the leftward side of the vehicle and an inward end, in the vehicle width direction, of the upper reinforcement 41 which is positioned on the rightward side of the vehicle are spaced apart from each other at the central position, in the vehicle width direction, of the vehicle, which corresponds to a layout of the tunnel portion 2.

Likewise, as shown in FIGS. 5 and 6, an inward end, in the vehicle width direction, of the lower reinforcement 42 which is positioned on the leftward side of the vehicle and an inward end, in the vehicle width direction, of the lower reinforcement 42 which is positioned on the rightward side of the vehicle are spaced apart from each other at the central position, in the vehicle width direction, of the vehicle, which corresponds to the layout of the tunnel portion 2

Accordingly, since the ridgelines X3, X5 of the cross member 18 are reinforced by the upper-and-lower reinforcements 41, 42, sectional deformation of the cross member 18 is suppressed in the normal vehicle traveling and the vehicle-body rigidity is improved. Thus, vibrations of the front floor panel 1 are suppressed by this improvement of this vehicle-body rigidity.

Moreover, since the upper-and-lower reinforcements 41, 42 reinforce the ridgelines X3, X5 of the cross member 18 except the central position, in the vehicle width direction, of the ridgelines, bending deformation of the floor tunnel 2 is not hindered in the vehicle side collision. Accordingly, the stress concentration at a joint portion 43 (see FIGS. 2 and 3) of the side sill 5 and the cross member 18 is suppressed, so that the part of the vehicle body positioned on the side of the side sill 5 is suppressed from hitting against the battery units 31, 32.

Further, since an inward side, in the vehicle width direction, of each of the battery units 31, 32 moves upwardly in the vehicle side collision according to the deformation of the tunnel portion 2, the pair of right-and-left battery units 31, 32 is suppressed from hitting against each other.

As shown in FIG. 4B, the above-described reinforcement portion comprises the upper reinforcement 41 and the lower reinforcement 42 which are provided along the ridgeline X3 of the cross member upper 19 and the ridgeline X5 of the cross member lower 20 and have the L-shaped cross section, respectively.

Specifically, the upper reinforcement 41 comprises a front face portion 41a which extends along the steep inclination portion 19c of the cross member upper 19, an upper face portion 41b which extends along the gentle inclination portion 19d of the cross member upper 19, and a ridgeline X7 which extends in the vehicle width direction at a position located between these face portions 41a, 41b.

Further, the upper reinforcement 41 and the cross member upper 19 are fastened together by a fastening member or fixed together by welding in a state where the ridgeline X7 of the upper reinforcement 41 extends along the ridgeline X3 of the cross member upper 19.

Moreover, the lower reinforcement 42 comprises a lower face portion 42a which extends along the lower face portion 20a of the cross member lower 20, a rear face portion 42b which extends along the vertical wall portion 20b of the cross member lower 20, and a ridgeline X8 which extends in the vehicle width direction at a position located between these face portions 42a, 42b.

Also, the lower reinforcement 42 and the cross member lower 20 are fastened together by a fastening member or fixed together by welding in a state where the ridgeline X8 of the lower reinforcement 42 extends along the ridgeline X5 of the cross member lower 20.

Thus, this simple structure, in which the reinforcements 41, 42 which are separate from the cross member 18 are provided along the ridgelines X3, X5 of the cross member 18, reinforces the ridgelines X3, X5 of the cross member 18 and suppresses the sectional deformation of the cross member 18 in the normal vehicle traveling.

As shown in FIGS. 5 and 6, the bracket 50 is provided at the central position, in the vehicle width direction, of the cross member 18, and the bracket 50 and the lower reinforcement 42 are joined together.

As shown in FIGS. 5, 6 and 7, the bracket 50 comprises a front-side central portion 51, right-and-left front face portions 53 which are formed continuously to right-and-left sides of the front-side central portion 51 via step portions 52, right-and-left side face portions 54 which extend rearwardly from respective outward ends, in the vehicle width direction, of the right-and-left front face portions 53, rear joint pieces 55 which extend outwardly, in the vehicle width direction, from respective rear ends of the right-and-left side face portions 54, and lower joint pieces 57 which extend outwardly, in the vehicle width direction, from the right-and-left side face portions 54 via leg portions 56.

The bracket 50 further comprises an upper-side central portion 58, right-and-left upper face portions 60 which are formed continuously to right-and-left sides of the upper-side central portion 58 via step portions 59, and bent pieces 61 which extend downwardly from respective outward sides, in the vehicle width direction, of the right-and-left upper face portions 60.

The above-described rear joint pieces 55 are joined to the rear face portion 42b of the lower reinforcement 42 by means of spot welding or the like, and the lower joint pieces 57 are joined to the lower face portion 42a of the lower reinforcement 42 by means of spot welding or the like. Thereby, the bracket 50 and the lower reinforcement 42 are fixedly joined together.

According to this embodiment, load transmission of the cross member 18 in the normal vehicle traveling is not hindered by providing the bracket 50. Specifically, since the bracket 50 serves as a transmission path of a side-collision load, the load transmission of the cross member 18 in the normal vehicle traveling is not hindered.

As shown in FIGS. 5, 6 and 7, notches 62, 63 are formed at the central position, in the vehicle width direction, of the bracket 50. That is, at the central position, in the vehicle width direction, of the bracket 50 is provided the notch 62 which is opened rearwardly as a fragile portion, and the notch 63 which is opened downwardly as another fragile portion is provided at a lower portion of the front-side central portion 51 of the bracket 50.

While the U-shaped notch is exemplified as the notches 62, 63 in the drawings, a V-shaped notch or a cut portion are applicable. Thus, since the notches 62, 63 as the fragile portion are formed at the bracket 50, the bracket 50 is deformed with a deformation starting point at the notches 62, 63 in the vehicle side collision, so that the deformation of the tunnel portion 2 is not hindered.

As shown in FIGS. 4, 5, 6 and 7, the bracket 50 is provided with a soft joint portion 64 having damping performance which is positioned between the cross member 50 and the bracket 50.

In the present embodiment, a vibration-damping adhesive having the high Young's modulus (the modulus of longitudinal elasticity) which is configured to attain vibration damping by accumulating the strain energy and dissipating this energy as heat is used as the soft joint portion 64.

As shown in FIGS. 4A, 4B-7, the soft joint portion 64 is provided on the upper portion 60 of the bracket 50 such that it contacts the gentle inclination portion 19d of the cross member upper 19 via the upper reinforcement 41.

According to this embodiment, the soft joint portion 64 positioned between the bracket 50 and the cross member upper 19 of the cross member 18 improves the ride quality of the vehicle.

As shown in FIGS. 4A and 4B, the specific ridgeline X3 among the plural ridgelines X1-X4 of the cross member upper 19 is an upper ridgeline, and the specific ridgeline X5 among the plural ridgelines X5, X6 of the cross member lower 20 is a lower ridgeline.

That is, the cross member 18 has the upper ridgeline X3 and the lower ridgeline X5. The upper-and-lower reinforcements 41, 42 reinforce the upper ridgeline X3 and the lower ridgeline X5. Specifically, the upper reinforcement 41 reinforces the upper ridgeline X3, and the lower reinforcement 42 reinforces the lower ridgeline X5.

According to this embodiment, since the upper-and-lower reinforcements 41, 42 reinforce the upper ridgeline X3 and the lower ridgeline X5, the sectional deformation of the cross member 18 is further suppressed.

As shown in FIGS. 3 and 10, the lower reinforcement 42 to reinforce the lower ridgeline X5 is provided with a pair of right-and-left tank attachment portions 45 to attach a fuel tank 70.

In a case where the battery units 31, 32 are removed from the lower vehicle-body structure of the plug-in hybrid electric vehicle shown in FIG. 8 and the same vehicle-body structure is applied to the four-wheel drive vehicle or the front-engine rear-drive vehicle which are driven by the general internal combustion engine, the fuel tank becomes necessary.

In this case, the fuel tank 70 is provided below the rear seat pan 22 as shown in FIG. 10. The fuel tank 70 is provided width a pair of right-and-left tank bands 71, 71 which are provided to be spaced apart from each other in the vehicle width direction, and each front end portion of the tank bands 71, 71 is fastened to the cross member lower 20 of the cross member 18 by a fastening member 72 and each rear end portion of the tank bands 71, 71 is fastened to the rear cross member lower 23 by a fastening member 73, whereby the fuel tank 70 is arranged below the rear seat pan 22.

The above-described fastening member 72 shown in FIG. 10 is fixedly fastened to the tank attachment portion 45 provided at the lower reinforcement 42 shown in FIG. 3.

According to this embodiment, since the lower reinforcement 42 has the tank attachment portion 45, the fuel tank 70 can be attached without any additional tank attachment portion.

Figure 12:
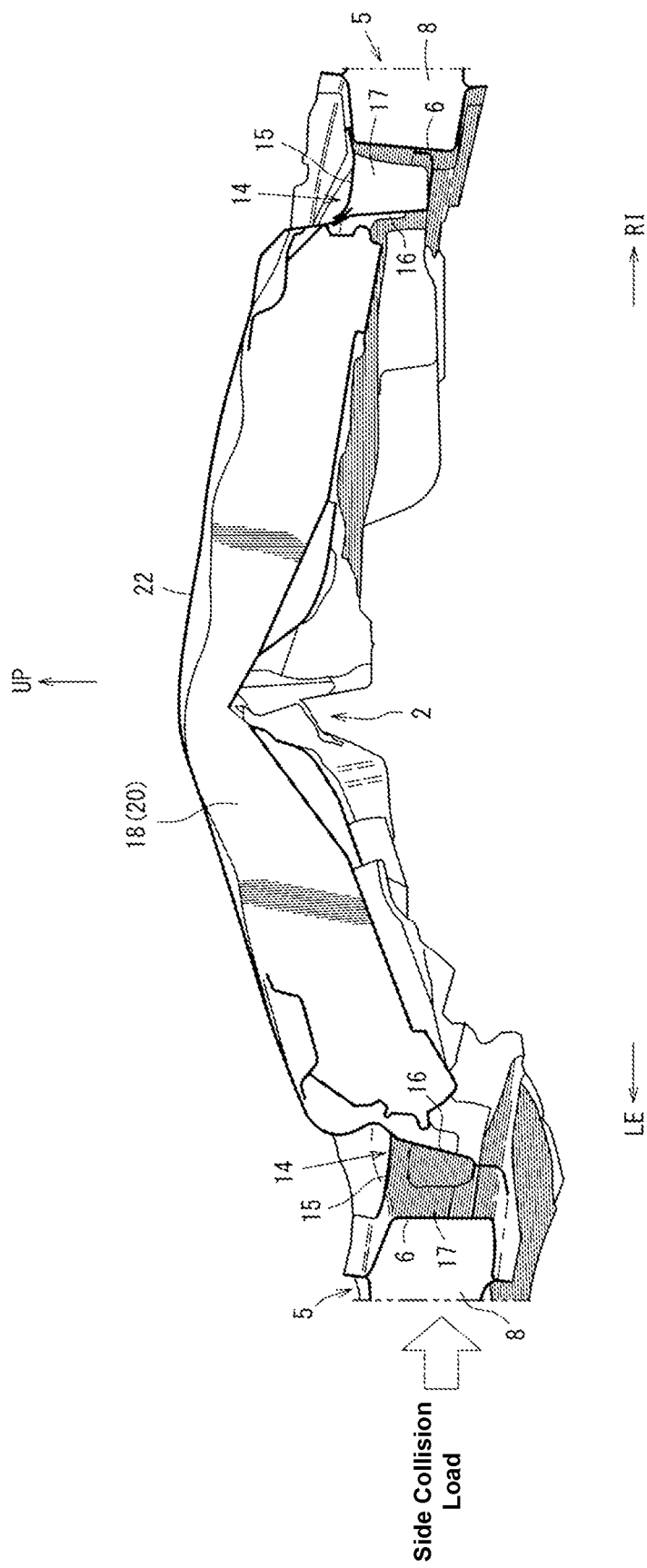
FIG. 12 is an explanatory diagram showing a state of moves of the cross member in the vehicle side collision, when viewed from the vehicle rearward side.
Figure 13:
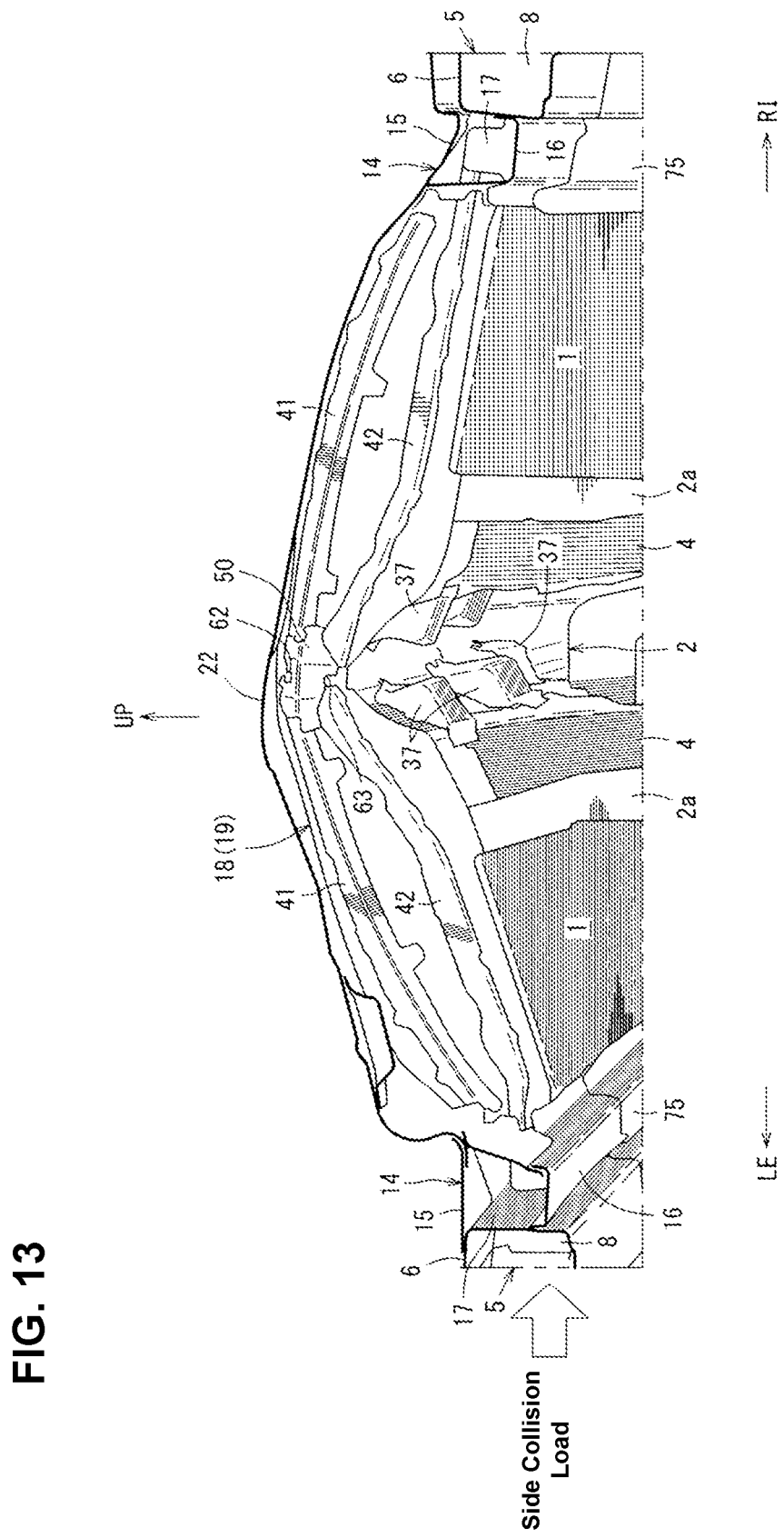
FIG. 13 is an explanatory diagram showing a state of moves of the upper-and-lower reinforcements and the bracket, when viewed from the vehicle rearward side.
Figure 14:
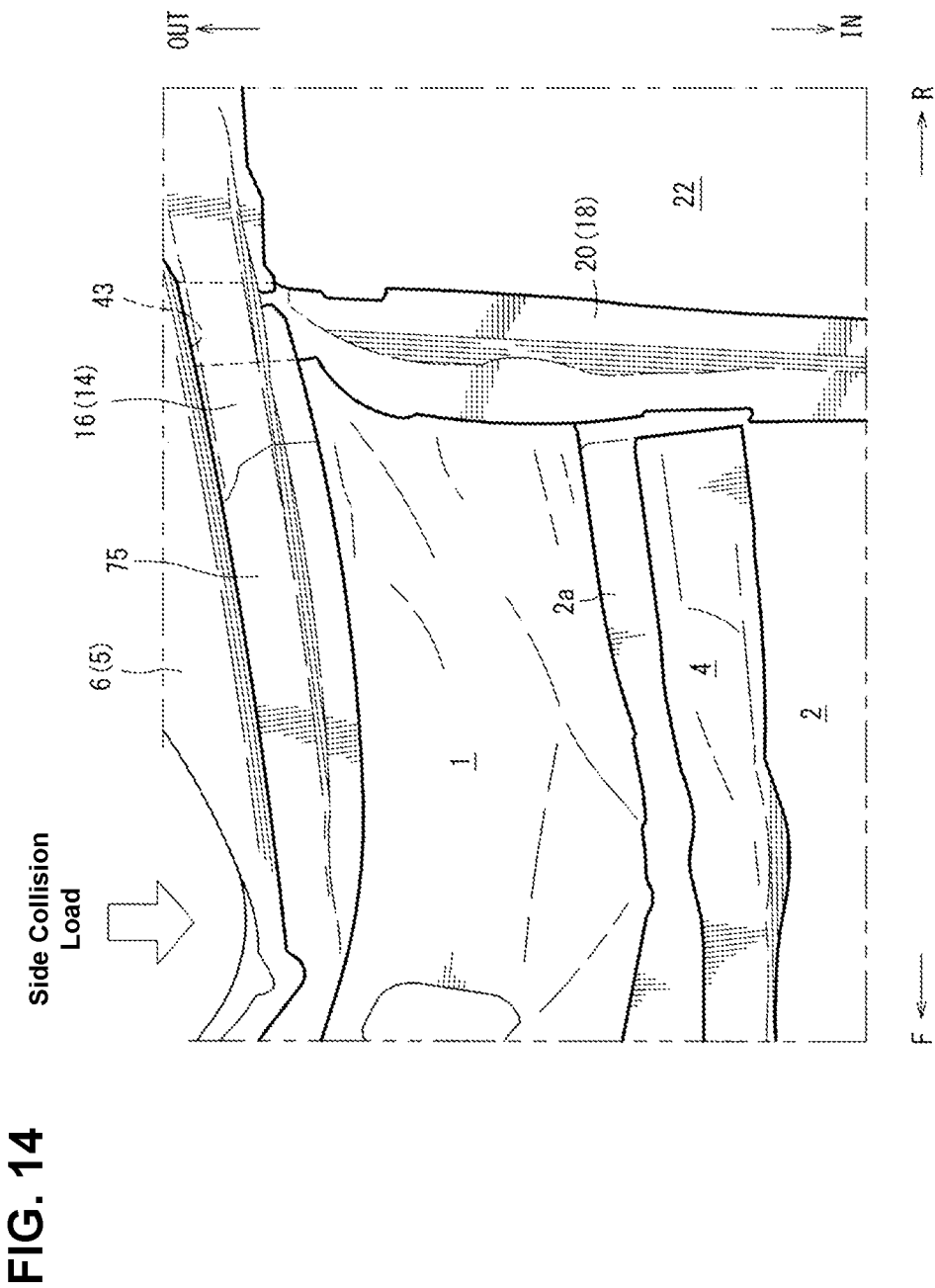
FIG. 14 is a bottom view showing a state of moves of the lower vehicle-body structure of the present embodiment in the vehicle side collision.

Next, moves of the present embodiment will be described referring to FIGS. 11-14. FIG. 11 is an explanatory diagram showing a state of moves of the battery units in the vehicle side collision, when viewed from a vehicle rearward side, FIG. 12 is an explanatory diagram showing a state of moves of the cross member in the vehicle side collision, when viewed from the vehicle rearward side, FIG. 13 is an explanatory diagram showing a state of moves of the upper-and-lower reinforcements and the bracket, when viewed from the vehicle rearward side, and FIG. 14 is a bottom view showing a state of moves of the lower vehicle-body structure of the present embodiment in the vehicle side collision. Herein, FIG. 13 shows a state where the cross member lower 20 is removed.

Herein, FIGS. 11-14 show deformation moves of respective portions when the same time has passed from a time point of application of the side-collision load from the vehicle leftward side.

As shown in FIG. 13, since the notches 62, 63 are formed at the central position, in the vehicle width direction, of the bracket 50 which is provided at the central position, in the vehicle width direction, of the cross member 18, the bracket 50 is deformed with the deformation starting point at the notches 62, 63 in the vehicle side collision.

Further, since the upper-and-lower reinforcements 41, 42 reinforce the ridgelines X3, X5 of the cross member 18 except the central portion, in the vehicle width direction, of the ridgelines, the bending deformation of the tunnel portion 2 is not hindered in the vehicle side collision. Thereby, as shown in FIG. 13, the tunnel portion 2 is bent and deformed such that the central portion, in the vehicle width direction, thereof moves upwardly.

Accordingly, the stress concentration at the joint portion 43 of the side sill 5 and the cross member 18 is suppressed, so that the part of the vehicle body positioned on the side of the side sill 5 can be suppressed from hitting against the battery unit 31.

As shown in FIGS. 12 and 13, the cross member 18 and the rear seat pan 22 are deformed such that the respective central portions, in the vehicle width direction, thereof move upwardly. Further, since each inward-side upper portion, in the vehicle width direction, of the battery units 31, 32 is deformed upwardly and outwardly, in the vehicle width direction, according to the crushing deformation of the tunnel portion 2 as shown in FIG. 11, the pair of right-and-left battery units 31, 32 can be suppressed from hitting against each other.

Figure 15:
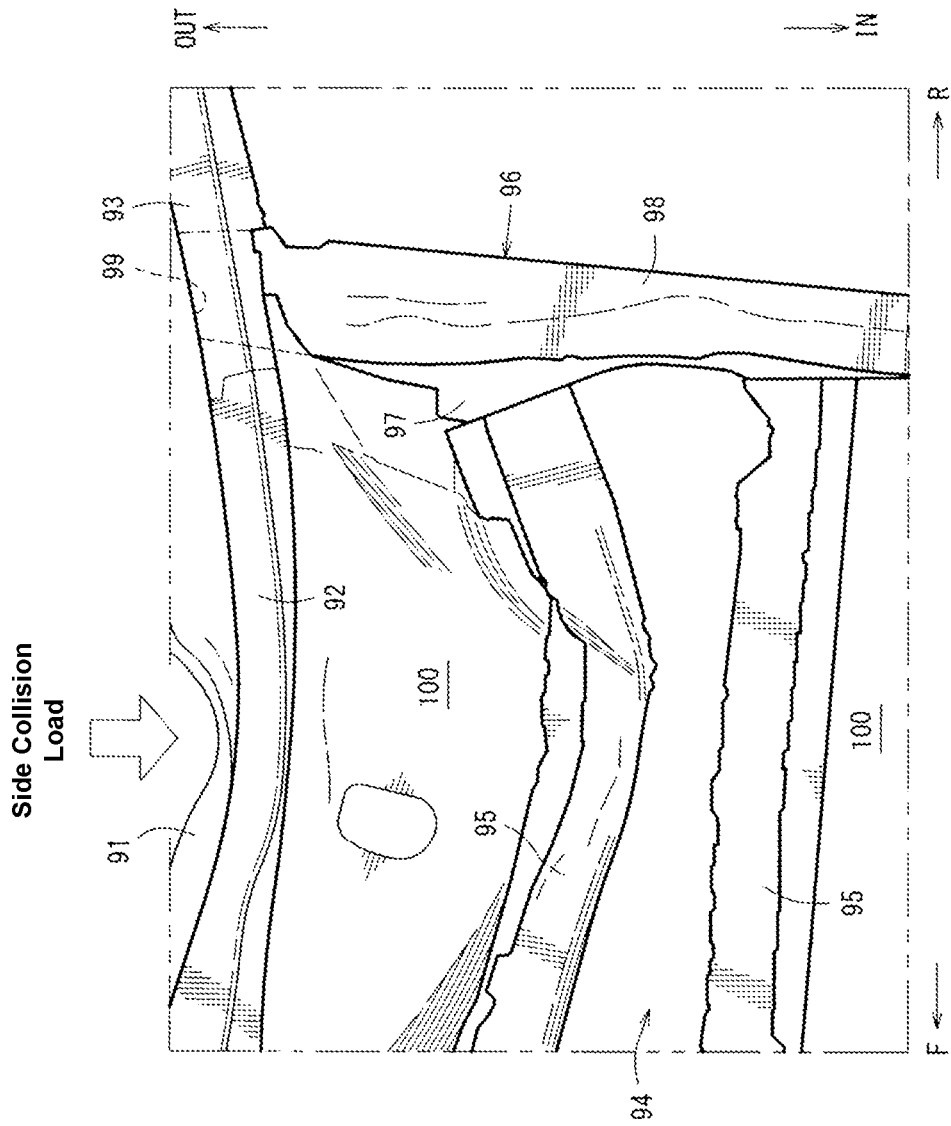
FIG. 15 is a bottom view showing a state of moves of a conventional lower vehicle-body structure in the vehicle side collision.

The crushing amount of the front floor panel 1 becomes smaller than that of the conventional structure shown in FIG. 15 because of the above-described crushing deformation of the tunnel portion 2 (see FIG. 14).

Herein, while the above-described description referred to the moves of the respective portions against the application of the side-collision load from the vehicle leftward side, the present embodiment provide the similar moves against the application of the side-collision load from the vehicle rightward side as well.

A reference character 74 denotes an exhaust pipe in FIG. 11. Further, in FIGS. 13 and 14, a reference character 75 denotes an underfloor floor frame which is provided between an inward side, in the vehicle width direction, of the side sill inner 6 and the front floor panel 1.

In the figures, an arrow F shows the vehicle forward side, an arrow R shows the vehicle rearward side, an arrow IN shows the inward side, in the vehicle width direction, of the vehicle, an arrow OUT shows the outward side, in the vehicle width direction, of the vehicle, an arrow LE shows the leftward side, in the vehicle width direction, of the vehicle, an arrow RI shows the rightward side, in the vehicle width direction, and an arrow UP shows the vehicle upward side.

As described above, the lower vehicle-body structure of the vehicle according to the present embodiment comprises the floor tunnel (tunnel portion 2) protruding upwardly and extending in the vehicle longitudinal direction at the central position, in the vehicle width direction, of the floor panel (front floor panel 1), the cross member 18 having the ridgelines X3, X5 extending in the vehicle width direction at the rear end of the floor tunnel (tunnel portion 2) and the closed-cross section portion 21 interconnecting the pair of right-and-left side sills 5, and the pair of right-and-left battery units 31, 32 positioned below the floor panel (front floor panel 1) and between the right-and-left side sills 5 and provided on the right-and-left sides, in the vehicle width direction, of the floor tunnel (tunnel portion 2), wherein the cross member 18 is provided with the reinforcement portion (reinforcements 41, 42) to reinforce the ridgelines X3, X5 in the range, in the vehicle width direction, which includes at least the position of the battery units 31, 32 and excludes the central position, in the vehicle width direction, of the ridgelines X3, X5 (se FIGS. 1, 3, 4A, 4B, 8 and 9).

According to this structure, since the ridgelines X3, X5 of the cross member 18 is reinforced by the reinforcement portion (reinforcements 41, 42), the sectional deformation of the cross member 18 can be suppressed in the normal vehicle traveling and the vehicle-body rigidity can be improved. Further, the vibrations of the floor panel (front floor panel 1) can be suppressed by this improvement of this vehicle-body rigidity.

Moreover, since the reinforcement portion (reinforcements 41, 42) reinforces the ridgelines X3, X5 of the cross member 18 except the central position, in the vehicle width direction, of the ridgelines X3, X5, the bending deformation of the floor tunnel (tunnel portion 2) is not hindered in the vehicle side collision. Accordingly, the stress concentration at the joint portion 43 of the side sill 5 and the cross member 18 is suppressed, so that the part of the vehicle body positioned on the side of the side sill 5 can be suppressed from hitting against the battery units, 31, 32.

Further, since the inward side, in the vehicle width direction, of each of the battery units 31, 32 moves upwardly in the vehicle side collision according to the deformation of the floor tunnel (tunnel portion 2), the pair of right-and-left battery units 31, 32 can be suppressed from hitting against each other as well.

Moreover, in the present embodiment, the reinforcement portion is the reinforcements 41, 42 which are provided along the ridgelines X3, X5 of the cross member 18 and have the L-shaped cross sections (see FIGS. 3 and 4A, 4B).

According to this structure, this simple structure in which the reinforcements 41, 42 which are separate from the cross member 18 are provided along the ridgelines X3, X5 of the cross member 18 can properly reinforce the ridgelines X3, X5 of the cross member 18 and suppress the sectional deformation of the cross member 18 in the normal vehicle traveling.

Also, in the present embodiment, the bracket 50 is provided at the central position, in the vehicle width direction, of the cross member 18, and the bracket 50 and the reinforcements 41, 42 are joined together (see FIGS. 5-7).

According to this structure, the load transmission of the cross member 18 in the normal vehicle traveling is not hindered by providing the bracket 50. Specifically, since the bracket 50 serves as the transmission path of the load, the load transmission of the cross member 18 in the normal vehicle traveling is not hindered.

Further, in the present embodiment, the fragile portion (see the notches 62, 63) is formed at the central position, in the vehicle width direction, of the bracket 50 (see FIGS. 5-7). According to this structure, since the fragile portion (see the notches 62, 63) is formed at the bracket 50, the bracket 50 can be deformed with the deformation starting point at the fragile portion (see the notches 62, 63) in the vehicle side collision, so that the deformation of the floor tunnel (tunnel portion 2) is not hindered.

Moreover, in the present embodiment, the fragile portion is the notches 62, 63. According to this structure, since the notches 62, 63 are formed at the bracket 50, the bracket 50 can be deformed with the deformation starting point at the notches 62, 63 in the vehicle side collision, so that the deformation of the floor tunnel (tunnel portion 2) is not hindered.

Additionally, in the present embodiment, the bracket 50 is provided with the soft joint portion 64 having the damping performance which is positioned between the cross member 18 and the bracket 50 (see FIGS. 5-7). According to this structure, the soft joint portion 64 positioned between the cross member 18 and the bracket 50 can improve the ride quality of the vehicle.

Further, in the present embodiment, the ridgelines X3, X5 of the cross member 18 comprise the upper ridgeline X3 and the lower ridgeline X5, and the reinforcements 41, 42 are configured to reinforce the upper ridgeline X3 and the lower ridgeline X5 (see FIG. 4). According to this structure, since the reinforcements 41, 42 reinforce the upper ridgeline X3 and the lower ridgeline X5, the sectional deformation of the cross member 18 can be further suppressed.

Also, in the present embodiment, the reinforcement 42 to reinforce the lower ridgeline X5 is provided with the tank attachment portion 45 to attach the fuel tank 70 (see FIGS. 3 and 10).

According to this structure, since the reinforcement 42 has the tank attachment portion 45, the fuel tank 70 can be attached without any additional tank attachment portion.

In correspondence of the present invention to the above-described embodiment, the floor panel of the present invention corresponds to the front floor panel 1 of the embodiment. Likewise, the floor tunnel corresponds to the tunnel portion 2, the side sill corresponds to the side sill 5, the cross member corresponds to the cross member 18, the closed-cross section portion corresponds to the closed-cross section portion 21, the battery unit corresponds to the first battery unit 31 and the second battery unit 32, the reinforcement portion corresponds to the upper reinforcement 41 and the lower reinforcement 42, the tank attachment portion corresponds to the tank attachment portion 45, the bracket corresponds to the bracket 50, the fragile portion corresponds to the notches 62, 63, the fuel tank corresponds to the fuel tank 70, and the ridgeline corresponds to the upper ridgeline X3 and the lower ridgeline X5. However, the present invention is not limited to the above-described embodiment and various modified embodiments are applicable.

As described above, the present invention is useful for the lower vehicle-body structure of the vehicle which comprises the floor tunnel protruding upwardly and extending in the vehicle longitudinal direction at the central position, in the vehicle width direction, of the floor panel, the cross member having the ridgeline extending in the vehicle width direction at the rear end of the floor tunnel and the closed-cross section portion interconnecting a pair of right-and-left side sills, and a pair of right-and-left battery units positioned below the floor panel and between the right-and-left side sills and provided on the right-and-left sides, in the vehicle width direction, of the floor tunnel.

What is claimed is:

1. A lower vehicle-body structure of a vehicle, comprising:
    a floor tunnel protruding upwardly and extending in a vehicle longitudinal direction at a central position, in a vehicle width direction, of a floor panel;
    a cross member having a ridgeline extending in the vehicle width direction at a rear end of the floor tunnel and a closed-cross section portion interconnecting a pair of right-and-left side sills; and
    a pair of right-and-left battery units positioned below the floor panel and between the right-and-left side sills and provided on right-and-left sides, in the vehicle width direction, of the floor tunnel,
    wherein said cross member is provided with a reinforcement portion to reinforce said ridgeline in a range, in the vehicle width direction, which includes at least the position of said battery units and excludes the central position, in the vehicle width direction, of the ridgeline.

2. The lower vehicle-body structure of the vehicle of claim 1, wherein said reinforcement portion is a reinforcement which is provided along the ridgeline of said cross member and has an L-shaped cross section.

3. The lower vehicle-body structure of the vehicle of claim 2, wherein a bracket is provided at a central position, in the vehicle width direction, of said cross member, and said bracket and said reinforcement are joined together.

4. The lower vehicle-body structure of the vehicle of claim 3, wherein a fragile portion is formed at a central position, in the vehicle width direction, of said bracket.

5. The lower vehicle-body structure of the vehicle of claim 4, wherein said fragile portion is a notch.

6. The lower vehicle-body structure of the vehicle of claim 3, wherein said bracket is provided with a soft joint portion having damping performance which is positioned between said cross member and the bracket.

7. The lower vehicle-body structure of the vehicle of claim 4, wherein said bracket is provided with a soft joint portion having damping performance which is positioned between said cross member and the bracket.

8. The lower vehicle-body structure of the vehicle of claim 2, wherein the ridgeline of said cross member comprises an upper ridgeline and a lower ridgeline, and said reinforcement is configured to reinforce said upper ridgeline and said lower ridgeline.

9. The lower vehicle-body structure of the vehicle of claim 8, wherein said reinforcement to reinforce said lower ridgeline is provided with a tank attachment portion to attach a fuel tank.

* * * * *